(12) United States Patent
Taylor (10) Patent No.: US 6,983,401 B2
(45) Date of Patent: Jan. 3, 2006

(54) SYSTEM AND METHOD FOR GENERATING A CHRONIC CIRCUIT REPORT FOR USE IN PROACTIVE MAINTENANCE OF A COMMUNICATION NETWORK

(75) Inventor: William Scott Taylor, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 526 days.

(21) Appl. No.: 10/136,603

(22) Filed: May 1, 2002

(65) Prior Publication Data

US 2003/0208705 A1 Nov. 6, 2003

(51) Int. Cl.
*G06F 11/00* (2006.01)

(52) U.S. Cl. .......................................... 714/45; 714/57
(58) Field of Classification Search ................. 714/45, 714/37–39, 57; 702/108, 117; 709/103
See application file for complete search history.

(56) References Cited

U.S. PATENT DOCUMENTS

| 5,724,263 | A  | * | 3/1998 | Raguram et al. ............. 702/84 |
| 5,974,568 | A  | * | 10/1999 | McQueen ..................... 714/38 |
| 6,378,067 | B1 | * | 4/2002 | Golliver et al. ............. 712/244 |
| 6,385,665 | B1 | * | 5/2002 | Canady et al. ................. 710/2 |
| 6,785,848 | B1 | * | 8/2004 | Glerum et al. ................ 714/38 |

* cited by examiner

*Primary Examiner*—Dieu-Minh Le
(74) *Attorney, Agent, or Firm*—Jones Day (57) ABSTRACT

A method for generating a chronic circuit report for use in maintaining a communication network is provided. The method comprises the steps of searching a database for information regarding circuit exceptions reported in a communication system, compiling a listing of circuits and circuit exception information, prioritizing the listing of the circuits based on the circuit exception information, and generating a circuit exception report.

37 Claims, 6 Drawing Sheets

| CIRCUIT ID # | EVT | MIN | MAJ | CRITICAL | TOTAL THIS PERIOD | TOTAL PREVIOUS PERIOD |
|---|---|---|---|---|---|---|
| 2 | 3 | 2 | 3 | 1 | 9 | 22 |
| 8 | 2 | 5 | 6 | 0 | 13 | 0 |
| 6 | 4000 | 5000 | 2 | 0 | 9002 | 15 |
| 3 | 0 | 0 | 0 | 0 | 0 | 15 |
| ... | ... | ... | ... | ... | ... | ... |

SYSTEM AND METHOD FOR GENERATING A CHRONIC CIRCUIT REPORT FOR USE IN PROACTIVE MAINTENANCE OF A COMMUNICATION NETWORK

BACKGROUND

1. Field of the Invention

This invention relates generally to telecommunication networks. More particularly, the invention relates to a system and method for proactively maintaining a telecommunications network.

2. Description of the Related Art

Proactive maintenance in a telecommunications network allows network operators to anticipate where problems may occur in the future and act proactively to prevent some customer problems from occurring. Proactive activities may also allow a network operator to determine if and help ensure that network performance service level agreements (SLAs) are being met and will continue to be met. Proactive activities preferably include identifying current and potential bottlenecks, inefficient or poorly performing components, potential failures, and others. A current way in which proactive maintenance is performed involves generating reports relating to equipment that are generating errors and evaluating the reports to determine which equipment to proactively maintain.

SUMMARY

A system and method for generating a chronic circuit report for use in maintaining a communication network is provided. In accordance with one aspect of the invention defined by the claims, the method comprises the steps of searching a database for information regarding circuit exceptions reported in a communication system, compiling a listing of circuits and circuit exception information, prioritizing the listing of the circuits based on the circuit exception information, and generating a circuit exception report.

In accordance with another aspect of the invention identified in the claims, a computer-implemented system for identifying circuits in a communication network having chronic troubles is provided. The system comprises a searching module, a prioritizing module, and a report generator module. The searching module searches through a database in a network monitoring system to identify communication circuits in a communication network that have had exceptions reported against them. The searching module also identifies the number of exceptions of a plurality of types reported against the communication circuits. The prioritizing module prioritizes the communication circuits identified by the searching module. The report generator module generates a report that lists the communication circuits that had exceptions reported against them.

In accordance with another aspect of the invention identified by the claims, a system for monitoring end-to-end circuit exceptions in a communication network having a plurality of network elements is provided. The system comprises a storage area having a database for storing information regarding exceptions reported against circuits in the communication network, a circuit error posting subsystem for posting to circuit records contained in the database the information regarding exceptions reported against circuits, and a reporting subsystem. The reporting subsystem comprises a searching module, a prioritizing module, and a report generator module.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

To facilitate the understanding of the invention described by the claims, an exemplary portion of a telecommunication network is described. The invention described by the claims is not limited to use solely with this portion of a telecommunication network, and could be applied to similar portions of a network or other portions of a network without departing from the scope of the invention.

Figure 1:
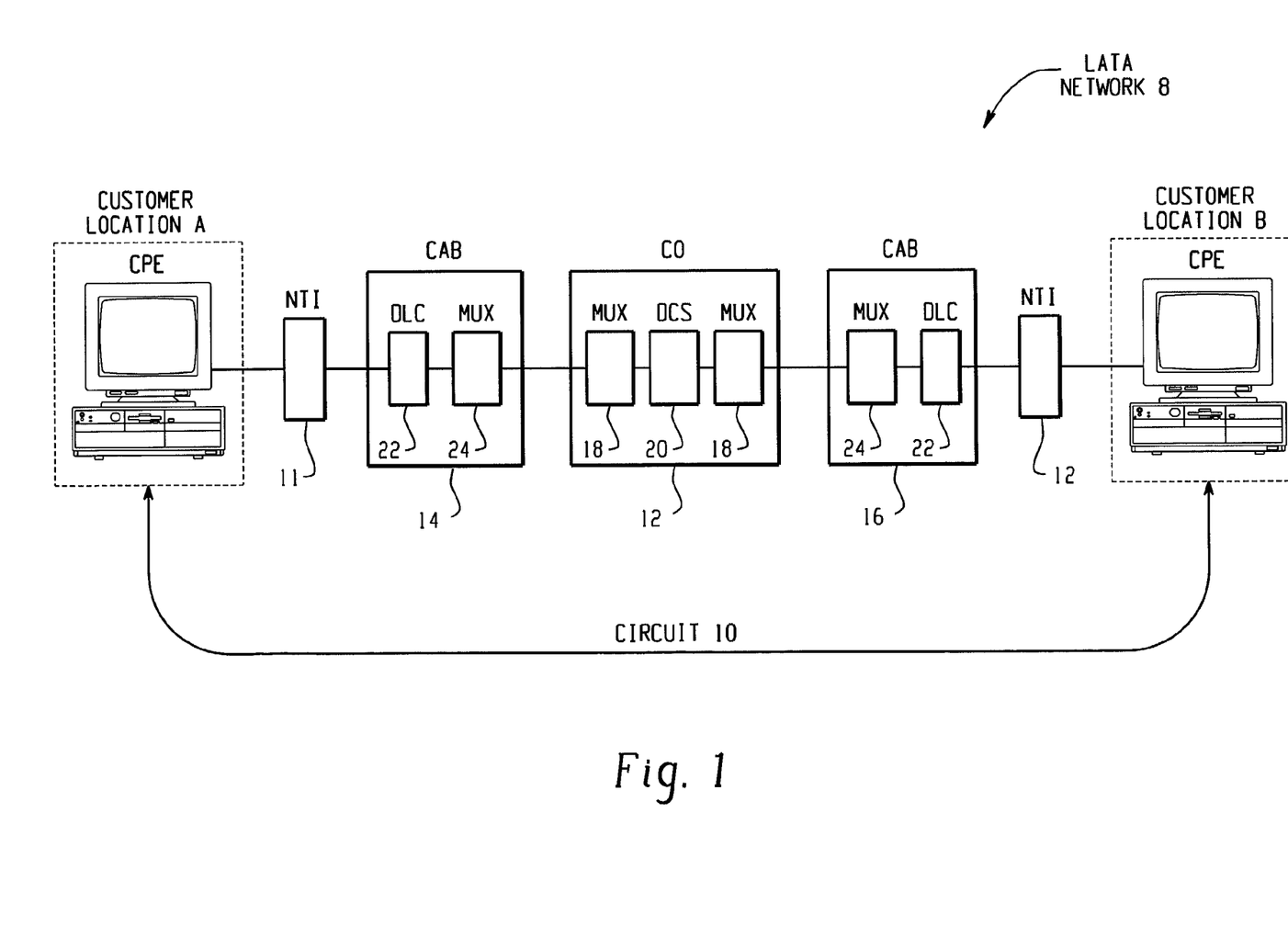
FIG. 1 is a schematic diagram of an exemplary section of a Local Access and Transport Area network.

Referring now to the drawings, shown in FIG. 1 is an exemplary section of a LATA Local Access and Transport Area network 8 that provides a circuit 10 for communication between two locations, customer location A and customer location B. In the illustrated example, the circuit provides the customer with a first subscriber network termination interface (NTI) 11 and a second subscriber NTI 12. Coupled to each NTI 11, 12, a subscriber may have various types of customer premises equipment (CPE) such as conventional telephones, facsimile machines, private branch exchanges, voice mail systems, key telephone systems, computers, modems, telephone answering machines, alarm systems, and radio control systems, as well as many other devices.

Coupled between each NTI 11, 12 in the illustrated circuit 10, are a central office (CO) 12, a first field cabinet 14, and a second field cabinet 16. The CO 12 and each field cabinet 14 and 16 comprise various types of switching and transmission network elements ("NE") that are configurable to provide the circuit 10. Examples of network elements that may be located at the CO 12 include Multiplexers (MUXs) 18, digital cross-connect systems (DCS) 20, and other equipment. Examples of network elements that may reside in the cabinets 14 and 16 include coder/decoder (codec) equipment, multiplexers ("MUXs") 24, line interface units ("LIUs"), Optical network units ("ONUs"), digital loop carrier ("DLC") equipment 22, HDSL Line Units ("HLUs"), HDSL Remote Units ("HRUs"), and others.

Figure 2:
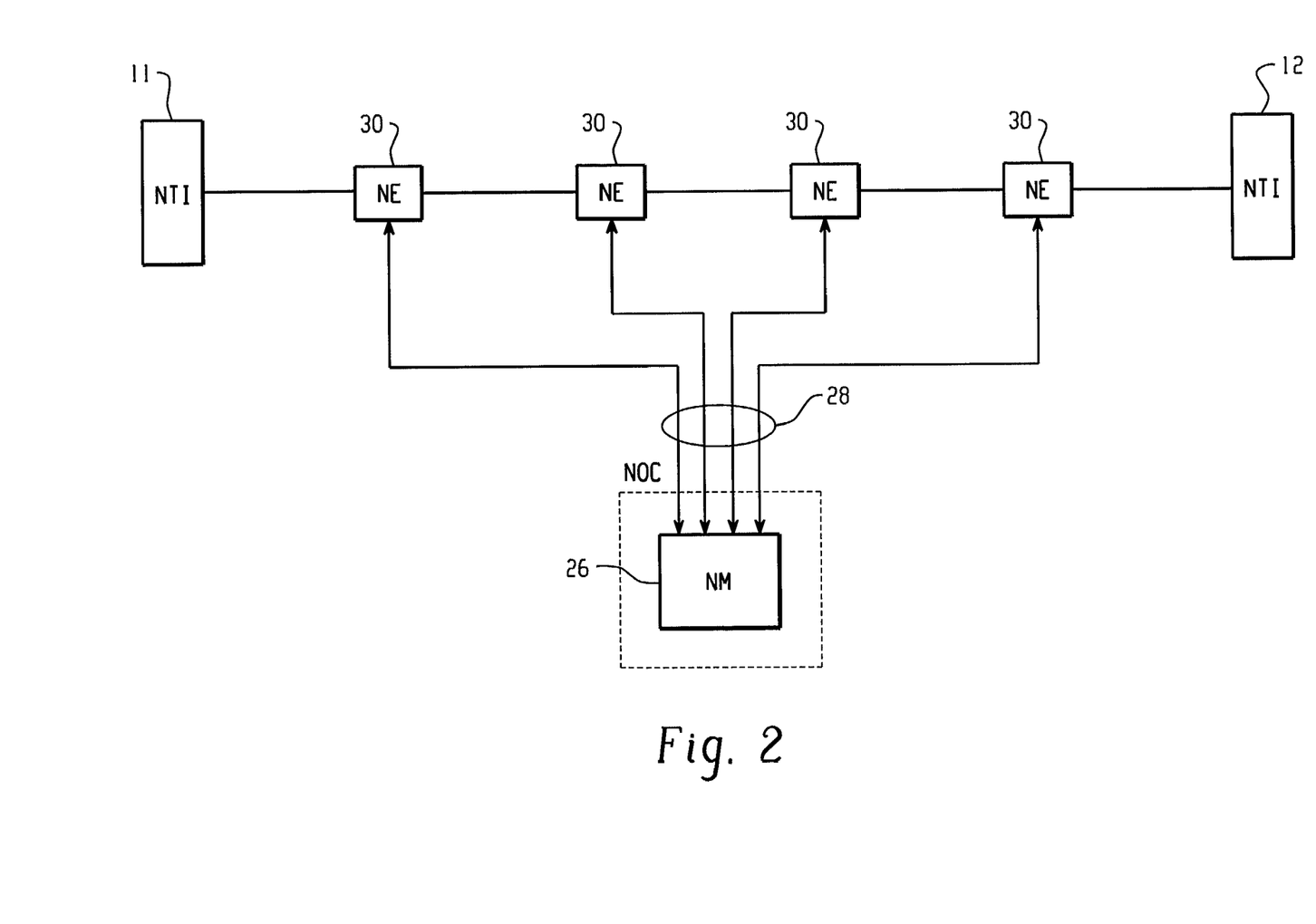
FIG. 2 is a block diagram of an exemplary section of a Local Access and Transport Area network having a network monitoring system in communication with network elements.
Figure 3:
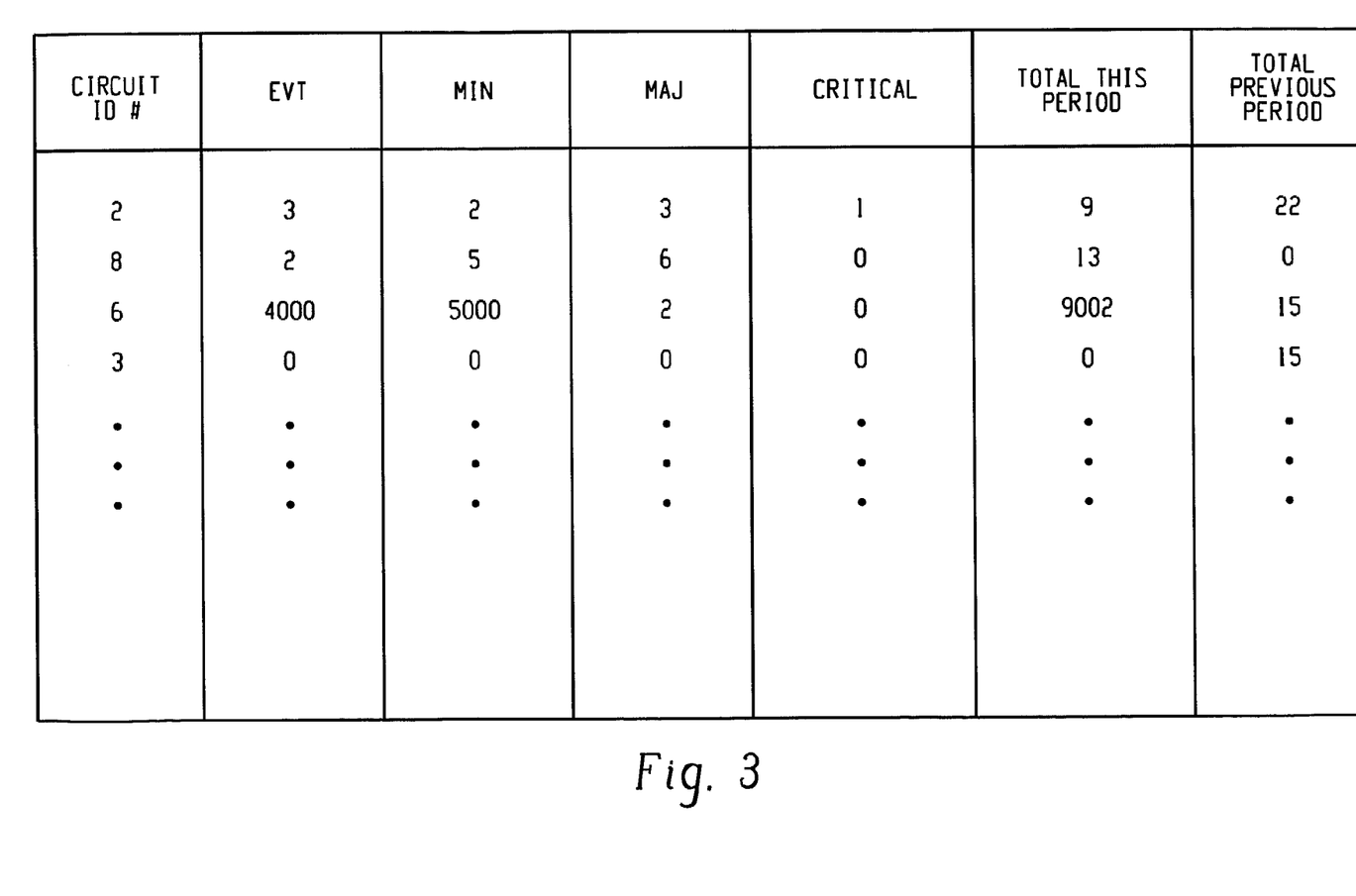
FIG. 3 is a chart that illustrates a preferred circuit report.

As illustrated in FIG. 2, a network monitoring ("NM") system 26 is also typically employed to monitor the performance of the network 8. The NM system 26 is one of the primary tools used in network maintenance. The NM system 26 typically establishes a permanent virtual channel (PVC) 28 with each NE 30 for monitoring both equipment performance and facilities performance. If a network system problem, such as an interruption to customer services is detected, maintenance technicians can be provided with network performance data from the NM system 26 to use in isolating and correcting the problem.

The preferred NM system 26 in the illustrated embodiment is the Telcordia Network Monitoring and Analysis ("NMA™") system although other NM systems could be employed. The NMA™ system 26 monitors the network 8 through, among other things, communicating with a large variety of NEs 30 and Operations Systems ("OSs") (not shown). The NMA™ system 26 can monitor and analyze problems on various types of networks, including Common Channel Signaling (CCS)/Signaling System 7 (SS7) networks, including class five switches, Synchronous Optical Network (SONET)/Synchronous Digital Hierarchy (SDH) networks (with TMN/Q3), Microsoft, wireless and broadband networks, and data communications and IP-based networks. The NMA™ system 26 is a client/server application that runs on a distributed architecture with a fault-tolerant server that services multiple operator stations.

Each of the NEs 30 report status and error messages to the NMA™ 26 on demand or on detection of a condition that requires the reporting of a message. The messages could relate to equipment inside of the NE, such as a circuit board, or something external to the NE that the NE can sense, such as a loss of signal on a channel serviced by the NE. Thus, the NEs report equipment alarm and facility alarms or line oriented alarms and equipment oriented alarms. The messages are sent via a NE's PVC to the NMA ™ 26 for further processing.

Many error messages reported to the NMA™ 26 result in no action being taken. Random errors occur and may not equate to a loss of service to a customer. Consequently, many error messages are not acted upon unless there has been a complaint by a customer.

Most maintenance activities with respect to the network 8 are performed on a reactive basis. For example, when a customer problem is detected, network operators react to the problem and dispatch service technicians to determine and isolate the problem. Having the ability to proactively maintain the network is desirable.

Proactive maintenance allows the network operators to anticipate where problems may occur in the future and act proactively to prevent some customer problems from occurring. Proactive activities may also allow a network operator to determine if and help ensure that network performance service level agreements (SLAs) are being met and will continue to be met. Proactive activities preferably include identifying current and potential bottlenecks, inefficient or poorly performing components, potential failures, and others.

Figure 4:
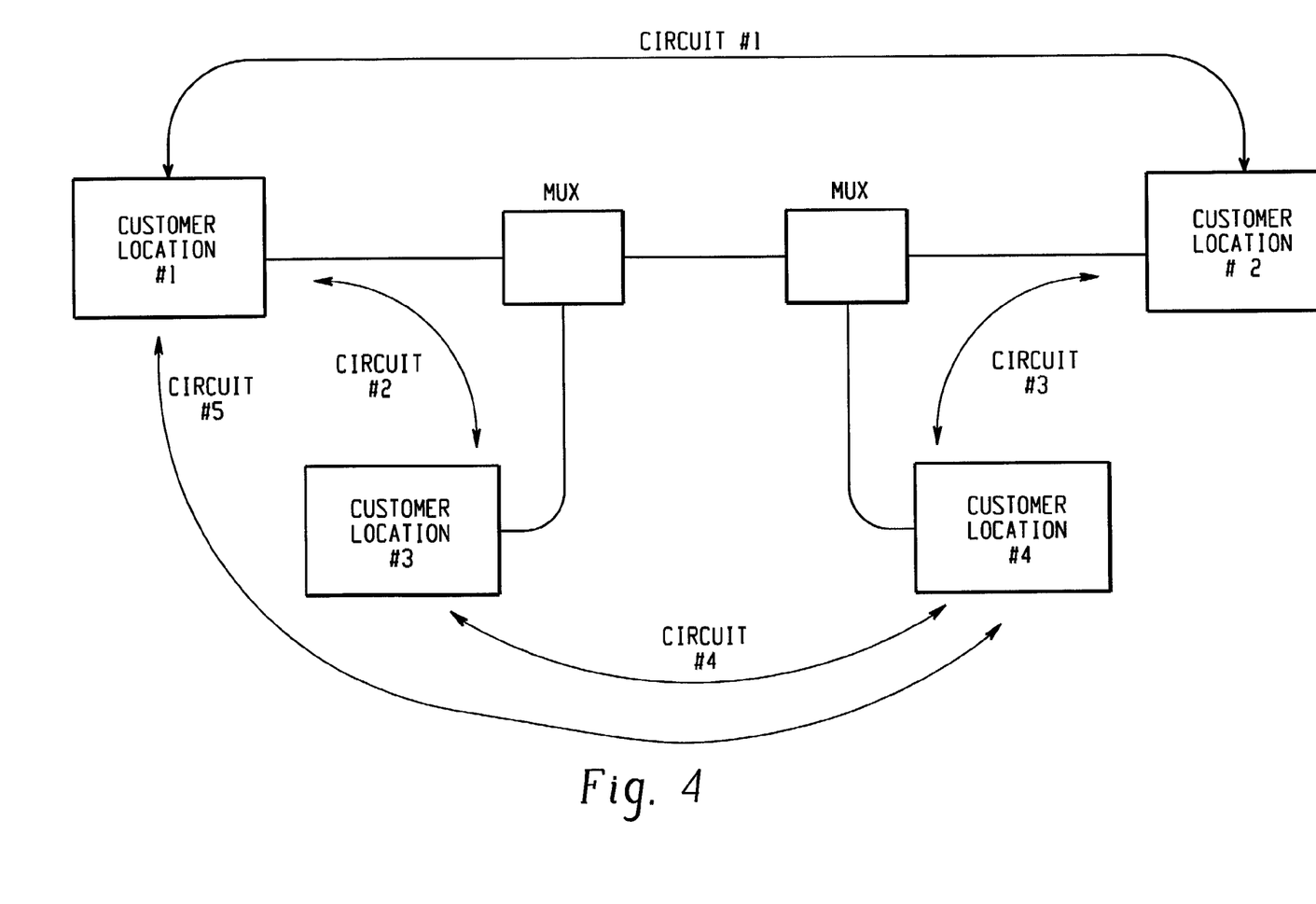
FIG. 4 is a block diagram of an exemplary network section illustrating a plurality of circuits.

Illustrated in FIG. 4 is an exemplary report from an exemplary reporting system that can be implemented by the NM system 26 for reporting circuit errors to the network operators to allow the network operators to proactively maintain the network 8. The reporting system accumulates per circuit the number of errors experienced by each circuit over a period of time. Preferably the report is a daily report that, everyday, lists the number of errors that were experienced by each circuit during the previous day. Preferably, the report also lists the number of errors experienced by the circuit during the day prior to the previous day. Preferably, the circuits listed on the report are those circuits that experienced errors during at least one of the prior two days. If a circuit did not experience any errors in the prior two days then it preferably would not be listed on the report. The reporting system prioritizes the circuit listing based on a prioritization scheme and provides the prioritized list to network operators to allow the network operators to attempt to solve issues on customer circuits in an effort to eliminate problems before the issues become problems or before a customer notices a problem.

The reporting system preferably categorizes error messages on the report as either events, minor alarms, major alarms or critical alarms. The reporting system also reports an accumulated total number of errors for the day and the accumulated total number of errors for the prior day.

The reporting system uses a prioritization scheme to prioritize the circuit listing. According to the preferred prioritization scheme, the circuit(s) with the largest number of critical alarms is (are) listed first, then the circuit(s) with the largest number of major alarms is (are) listed next, followed by the circuit(s) with the largest number of minor alarms, and finally the circuit(s) with the largest number of events. Alternate prioritization schemes could also so be employed such as prioritization based on the total number of errors for the day or some other criteria.

Illustrated in FIG. 4 is an exemplary block diagram of a portion of a LATA network that provides services to four customer locations. Customer location #1 is provided with a circuit to customer location #2 (circuit #1), a circuit to customer location #3 (circuit #2), and a circuit to customer location #4 (circuit #5). Customer location #2 is provided with a circuit to customer location #1 (circuit #1) and a circuit to customer location #4 (circuit #3). Customer location # 3 is provided with a circuit to customer location #1 (circuit #2) and a circuit to customer location #4 (circuit #4). Customer location #4 is provided with a circuit to customer location #2 (circuit #3), a circuit to customer location #3 (circuit #4), and a circuit to customer location #1 (circuit #5).

The reporting system could be used to chart errors occurring in each of the circuits and provide a report to a service operator. The reporting system could report to the service operator, for example, that circuit #4 is experiencing some errors that may be worth further investigating before service on circuit #4 is severely affected.

Figure 5:
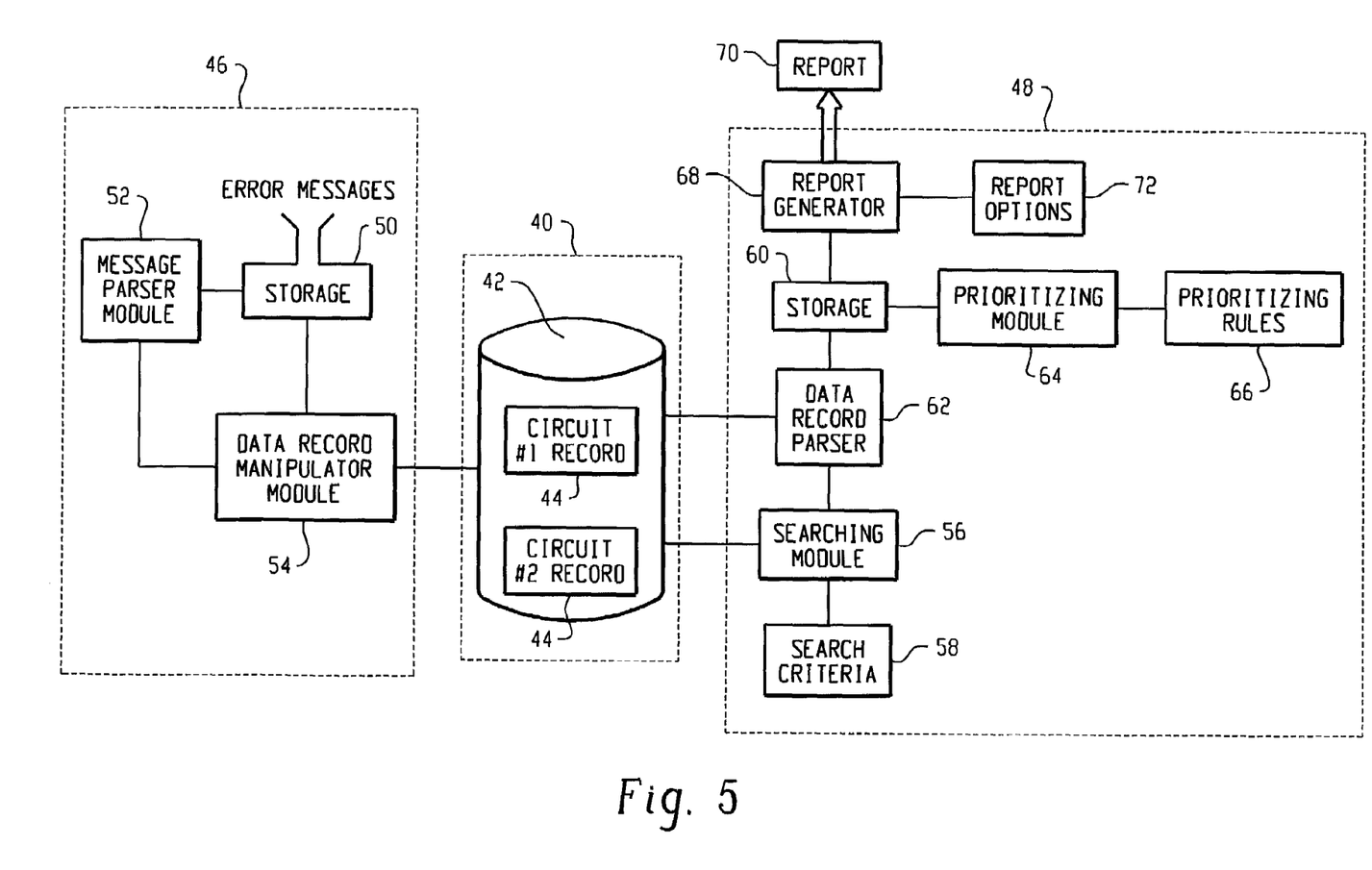
FIG. 5 is a block diagram that illustrates a preferred network monitoring system.

Illustrated in FIG. 5 is an exemplary reporting system that could be implemented within the NM system 26. In the description that follows the term module is used. The term module as used herein is a generic term used to describe any entity such as hardware, software, firmware, or a combination of the above that causes the execution of some function.

Preferably, associated with the NM system 26 is a storage area 40 and more preferably a network architecture database 42. The network architecture database preferably is used to store a number of data records including a circuit record 44 for each provisioned circuit within the network.

The NM system 26 includes a circuit error posting subsystem 46 for posting circuit errors to the circuit record 44 that corresponds to the circuit that experienced the error. The NM system 26 also includes a reporting subsystem 48 that produces a prioritized report of circuits experiencing errors.

The circuit error posting subsystem 46 receives error messages sent from NEs and preferably temporarily stores the messages in a storage area 50. A message parser module 52 determines, by examining the error message, which circuit the received error message relates to. A data record manipulator module 54, using the output from the message parser module 52, posts the error message to the circuit record that corresponds to the circuit that the error message pertains to. The circuit error posting subsystem 46 performs this function whenever a circuit error message is received.

On a periodic basis, preferably daily, the reporting subsystem 48 produces a prioritized report of circuits experiencing errors during the previous period. The reporting subsystem 48 preferably includes a searching module 56 that on a daily basis searches through the circuit records using established search criteria 58. Preferably the search criteria 58 causes the searching module 56 to identify circuit records that indicate that the associated circuit experienced some kind of error either the prior day or the day prior to that.

Circuit record error information from the circuit records 44 identified by the searching module 56 is preferably outputted to a storage area 60. Preferably, the information outputted includes the circuit identification, the number of errors of each type experienced by the circuit during the previous day, and the total number of errors experienced by the circuit the day prior to the previous day. Preferably, a data record parser module 62 retrieves the circuit error information from the circuit records identified by the searching module 56 and outputs the information to the error information storage area 60. The storage area 60 preferably is a file, but optionally could be a location in memory, and/or a location in a database, or others.

Preferably, a prioritizing module 64 prioritizes the error information in the storage area in accordance with a prioritizing algorithm 66 and a report generator 68 generates a report 70. The report generator module 68, preferably, generates a report 70 in some form, such as a visual on screen report or a printed report, using the prioritized circuit exception information. The circuit generator module 68 optionally may have inputs that allow a user to select report options 72 that allow the generated report 70 to be customized.

Figure 6:
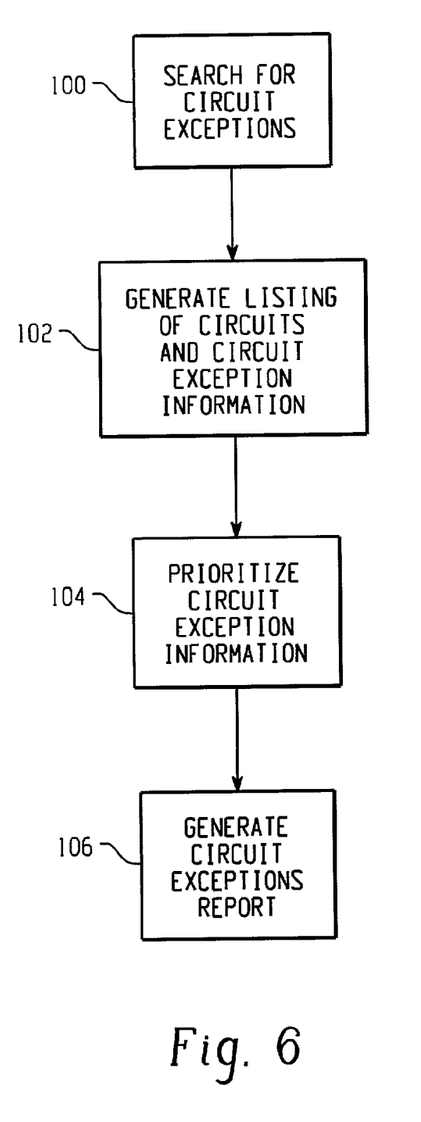
FIG. 6 is a flow chart that illustrates a preferred method for generating a circuit exception report.

Illustrated in FIG. 6 is an example of a method for generating a circuit exception report. The method assumes that circuit exceptions have already been reported to the NM system 26 and have been recorded. In step 100, a search is made in the database or file where the circuit exceptions have been recorded. Preferably, the search results in identifying circuits that experienced errors and the errors experienced during the two prior days.

In step 102, the retrieved information is tallied, organized and recorded to produce a file, data structure, or some other information holding structure that includes for each circuit information relating to the exceptions experienced by that circuit. Preferably the exception information includes the number of the various types of exceptions experienced in the preceding day and the total number of exceptions experienced in the day prior to the preceding day. If a circuit did not experience any errors in the two preceding days, preferably the circuit was either not included in the tally or removed from the tally.

In step 104, the circuit exception information file was prioritized according to a set of prioritization rules. The preferred prioritization rules provide that the order be determined first based on the number of critical exceptions experienced, then based on the number of major exceptions experienced, then based on the number of minor exceptions experienced, and finally based on the number of events experienced. Other prioritization rules, however, may be implemented.

In step 106, a circuit exceptions report is generated from the prioritized information. The report could take on many different forms. It could include some or all of the error information for each circuit. It could displayable via a computer screen or be in the form of a printed report, or both. It could be in the form of a graphical display or a non-graphical display. The exception report could categorize the various types of exceptions, or alternatively tally the number of each type of exception experienced per circuit.

Finally, network operator personnel can use the generated report to perform proactive maintenance on sections of the network or on various circuits identified by the circuit exceptions report.

Figure 7:
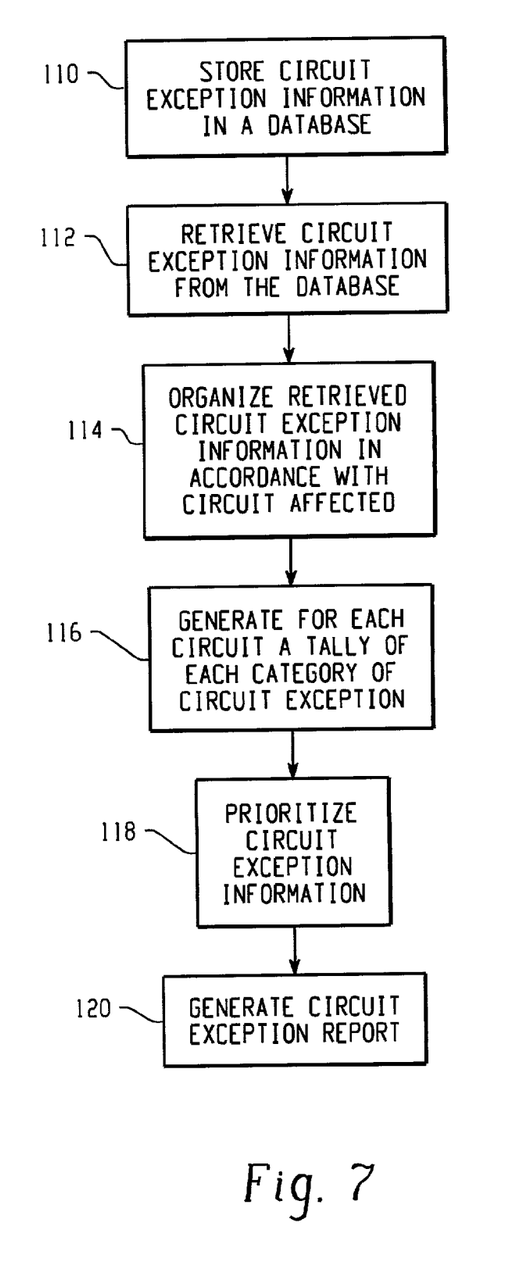
FIG. 7 is a flow chart illustrates another method for generating a circuit exception report.

Illustrated in FIG. 7 is an example of another method for generating a circuit exceptions report that can be used by maintenance personnel in performing network maintenance. In step 110, circuit exception information is stored in a database. In step 112, exception information is retrieved from the database. In step 114, the retrieve information is organized via affected circuit. In step 116, the organized information is categorized and tallied such that for each circuit a count is generated that corresponds to the number of exceptions that circuit experienced for that category of exception. In step 118, the categorized and tallied circuit exception information is prioritized in accordance with prioritization rules. Finally, in step 120, a report is generated containing the prioritized circuit exception information. Other variations from these systems and methods should become apparent to one of ordinary skill in the art without departing from the scope of the invention defined by the claims.

The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims. Although the embodiments have been described with reference to a Local Access and Transport Area network, it is contemplated that the invention could be applicable to devices and systems that use other transport network configurations.

The following is claimed:

1. A computer-implemented system for identifying circuits in a communication network having chronic troubles, comprising:

a searching module that searches a database to identify communication circuit exceptions;

a prioritizing module having a data communication path with the searching module for prioritizing the communication circuit exceptions identified by the searching module; and a report generator module having a data communication path with the prioritizing module for generating a chronic circuit report, the chronic circuit report comprising:

a listing of communication circuits in the communication network that have had exceptions reported against them in at least one of two preceding time periods, wherein the order of circuit listing is based on the prioritizing performed by the prioritizing module;

a listing of the total number of exceptions reported against each circuit on the list that occurred in the time period prior to the most recent time period;

a listing of the total number of exceptions reported against each circuit on the list in the most recent time period;

a plurality of categories of exceptions; and
a listing of the total number of exceptions reported for each circuit on the list in each category over the current time period.

2. The system according to claim 1 wherein the searching module categorizes the circuit exceptions into a plurality of categories.

3. The system according to claim 2 wherein the searching module categorizes the circuit exceptions into four categories.

4. The system according to claim 3 wherein the four categories are events, minor, major, and critical.

5. The system according to claim 2 wherein the searching module tallies the total number of exceptions in each category reported against each circuit.

6. The system according to claim 2 wherein the prioritizing module follows prioritizing rules and wherein a first rule is that each category of exceptions has a distinct priority and the circuit having the highest number of exceptions in the highest priority category is assigned the highest priority.

7. The system according to claim 1 wherein the searching module identifies all circuits having exceptions reported against it during the two most recent time periods.

8. The system according to claim 7 wherein the time period is a day.

9. The system according to claim 1 wherein the searching module identifies the circuits having exceptions reported against them on a daily basis.

10. A system for monitoring end-to-end circuit exceptions in a communication network having a plurality of network elements, the system comprising:
a storage area having a database for storing information regarding exceptions reported against circuits in the communication network;
a circuit error posting subsystem for posting to circuit records contained in the database the information regarding exceptions reported against circuits; and
a reporting subsystem comprising,
a searching module that searches the database to identify communication circuits exceptions;
a prioritizing module having a data communication path with the searching module for prioritizing the communication circuit exceptions identified by the searching module; and
a report generator module having a data communication path with the prioritizing module for generating a chronic circuit report, the chronic circuit report comprising:
a listing of communication circuits in the communication network that have had exceptions reported against them in at least one of two preceding time periods, wherein the order of circuit listing is based on the prioritizing performed by the prioritizing module;
a listing of the total number of exceptions reported against each circuit on the list that occurred in the time period prior to the most recent time period;
a listing of the total number of exceptions reported against each circuit on the list in the most recent time period;
a plurality of categories of exceptions; and
a listing of the total number of exceptions reported for each circuit on the list in each category over the current time period.

11. The system according to claim 10 wherein the searching module categorizes the circuit exceptions into a plurality of categories.

12. The system according to claim 11 wherein the searching module categorizes the circuit exceptions into four categories.

13. The system according to claim 12 wherein the four categories are events, minor, major, and critical.

14. The system according to claim 11 wherein the searching module tallies the total number of exceptions in each category reported against each circuit.

15. The system according to claim 11 wherein the prioritizing module follows prioritizing rules and wherein a first rule is that each category of exceptions has a distinct priority and the circuit having the highest number of exceptions in the highest priority category is assigned the highest priority.

16. The system according to claim 10 wherein the searching module identifies all circuits having exceptions reported against it during the two most recent time periods.

17. The system according to claim 16 wherein the time period is a day.

18. The system according to claim 10 wherein the searching module identifies the circuits having exceptions reported against them on a daily basis.

19. A communication network, comprising:
a plurality of network elements; and
a monitoring system for monitoring end-to-end circuit exceptions reported by the network elements, the monitoring system comprising,
a storage area having a database for storing information regarding exceptions reported against circuits in the communication network;
a circuit error posting subsystem for posting to circuit records contained in the database the information regarding exceptions reported against circuits; and
a reporting subsystem comprising,
a searching module that searches the database to identify communication circuit exceptions;
a prioritizing module having a data communication path with the searching module for prioritizing the communication circuit exceptions identified by the searching module; and
a report generator module having a data communication path with the prioritizing module for generating a chronic circuit report, the chronic circuit report comprising:
a listing of communication circuits in the communication network that have had exceptions reported against them in at least one of two preceding time periods, wherein the order of circuit listing is based on the prioritizing performed by the prioritizing module;
a listing of the total number of exceptions reported against each circuit on the list that occurred in the time period prior to the most recent time period;
a listing of the total number of exceptions reported against each circuit on the list in the most recent time period;
a plurality of categories of exceptions; and
a listing of the total number of exceptions reported for each circuit on the list in each category over the current time period.

20. The network according to claim 19 wherein the searching module categorizes the circuit exceptions into a plurality of categories.

21. The network according to claim 20 wherein the searching module categorizes the circuit exceptions into four categories.

22. The network according to claim 21 wherein the four categories are events, minor, major, and critical.

23. The network according to claim 20 wherein the searching module tallies the total number of exceptions in each category reported against each circuit.

24. The network according to claim 20 wherein the prioritizing module follows prioritizing rules and wherein a first rule is that each category of exceptions has a distinct priority and the circuit having the highest number of exceptions in the highest priority category is assigned the highest priority.

25. The network according to claim 19 wherein the searching module identifies all circuits having exceptions reported against it during the two most recent time periods.

26. The network according to claim 25 wherein the time period is a day.

27. The network according to claim 19 wherein the searching module identifies the circuits having exceptions reported against them on a daily basis.

28. A method for identifying circuits having chronic troubles, comprising the steps of:
retrieving circuit exception information that is stored in a database;
organizing the retrieved information by affected circuit;
categorizing and tallying the organized information so that for each circuit a count is generated that corresponds to the number of exceptions that the circuit experienced for that category of exception;
prioritizing the categorized and tallied circuit exception information in accordance with prioritization rules; and
generating a report containing the prioritized circuit exception information, the report generated comprising:
a listing of communication circuits in the communication network that have had exceptions reported against them in at least one of two preceding time periods, wherein the order of circuit listing is based on the prioritizing performed by the prioritizing module;
a listing of the total number of exceptions reported against each circuit on the list that occurred in the time period prior to the most recent time period;
a listing of the total number of exceptions reported against each circuit on the list in the most recent time period;
a plurality of categories of exceptions; and
a listing of the total number of exceptions reported for each circuit on the list in each category over the current time period.

29. The method according to claim 28 wherein the organized information is categorized into a plurality of categories.

30. The method according to claim 29 wherein the organized information is categorized into four categories.

31. The method according to claim 30 wherein the four categories are events, minor, major, and critical.

32. The method according to claim 29 wherein the total number of exceptions in each category reported against each circuit is tallied.

33. The method according to claim 29 wherein the prioritizing step is conducted in accordance with prioritizing rules and wherein a first rule is that each category of exceptions has a distinct priority and the circuit having the highest number of exceptions in the highest priority category is assigned the highest priority.

34. The method according to claim 28 wherein the retrieved circuit exception information is related to exceptions reported against circuits during the two most recent time periods.

35. The method according to claim 34 wherein the time period is a day.

36. The method according to claim 28 wherein the retrieving step is performed on a daily basis.

37. A method for generating a chronic circuit report for use in maintaining a communication network, comprising the steps of:
searching a database for information regarding circuit exceptions reported in a communication system;
compiling a listing of circuits and circuit exception information;
prioritizing the listing of the circuits based on the circuit exception information; and
generating a circuit exception report, the circuit exception report comprising:
a listing of communication circuits in the communication network that have had exceptions reported against them in at least one of two preceding time periods, wherein the order of circuit listing is based on the prioritizing performed by the prioritizing module;
a listing of the total number of exceptions reported against each circuit on the list that occurred in the time period prior to the most recent time period;
a listing of the total number of exceptions reported against each circuit on the list in the most recent time period;
a plurality of categories of exceptions; and
a listing of the total number of exceptions reported for each circuit on the list in each category over the current time period.

* * * * *